United States Patent
Jeong et al.

(10) Patent No.: US 9,371,420 B2
(45) Date of Patent: Jun. 21, 2016

(54) FLAME-RETARDING CARBON DIOXIDE/EPOXIDE COPOLYMER AND METHOD FOR PREPARING THE SAME

(71) Applicant: SK Innovation Co., Ltd., Seoul (KR)

(72) Inventors: Jisu Jeong, Daejeon (KR); SungJae Na, Suwon-si (KR); Sujith Sudevan, Daejeon (KR); MyungAhn Ok, Daejeon (KR); YongGyu Han, Daejeon (KR); KwangJin Chung, Daejeon (KR); BunYeoul Lee, Suwon-si (KR); Anish Cyriac, Suwon-si (KR); SangHwan Lee, Suwon-si (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 14/480,879

(22) Filed: Sep. 9, 2014

(65) Prior Publication Data

US 2014/0378651 A1  Dec. 25, 2014

Related U.S. Application Data

(62) Division of application No. 13/369,991, filed on Feb. 9, 2012, now Pat. No. 8,912,307.

(30) Foreign Application Priority Data

Feb. 10, 2011  (KR) .................. 10-2011-0011754

(51) Int. Cl.
  *C08G 64/34* (2006.01)
  *C08G 64/02* (2006.01)
  (Continued)

(52) U.S. Cl.
  CPC ............ *C08G 64/34* (2013.01); *C08G 64/0208* (2013.01); *C08G 64/0258* (2013.01); *C08G 64/403* (2013.01); *C08G 64/406* (2013.01); *C08G 65/2603* (2013.01)

(58) Field of Classification Search
  CPC ........................................... C08G 64/34
  USPC .................. 528/405, 410, 412, 421
  See application file for complete search history.

(56) References Cited

U.S. PATENT DOCUMENTS 8,530,616 B2   9/2013   Jeong et al.
8,598,309 B2   12/2013  Jeong et al.
(Continued)

FOREIGN PATENT DOCUMENTS

KR   100853358 B1   8/2008
KR   1020090090154 A   8/2009
(Continued)

OTHER PUBLICATIONS

Cyriac et al; Preparation of flame retarding poly(propylene carnbonate); Royal Society of Chemistry; Nov. 2011; Chem Abstract 156: 75185.*

(Continued)

*Primary Examiner* — Duc Truong
(74) *Attorney, Agent, or Firm* — The Webb Law Firm

(57) ABSTRACT

There is provided a method for preparing a low-molecular weight poly(alkylene carbonate) of which the molecular weight and chain shape are precisely controlled, by introducing a phosphorous compound having a hydroxyl group as a chain transfer agent in order to regulate the molecular weight, in alternating copolymerizing an epoxide compound and carbon dioxide by using trivalent metal complex prepared from a Salen type ligand containing a quaternary ammonium salt, and a polymer prepared by the method.

Since poly(alkylene carbonate) prepared according to the present invention includes a phosphate or phosphonate group in the polymer chain, it has flame-retarding property.

6 Claims, 1 Drawing Sheet

(51) Int. Cl.
*C08G 64/40* (2006.01)
*C08G 65/26* (2006.01)

(56) References Cited

U.S. PATENT DOCUMENTS

| | | | |
|---|---|---|---|
| 8,637,634 | B2 | 1/2014 | Jeong et al. |
| 8,785,592 | B2 | 7/2014 | Jeong et al. |

FOREIGN PATENT DOCUMENTS

| | | |
|---|---|---|
| KR | 1020100013255 A | 2/2010 |
| WO | 2008136591 A1 | 11/2008 |
| WO | 2010013948 A2 | 2/2010 |
| WO | 2010147421 A2 | 12/2010 |

OTHER PUBLICATIONS

Cyriac et al., Immortal C02/Propylene Oxide Copolymerization: Precise Control of Molecular Weight and Architecture of Various Block Copolymers, Macromolecules, 2010, pp. 7398-7401, vol. 43.

Kim et al., Cobalt(III) Complexes of Various Salen-Type Ligand Bearing Four Quaternary Ammonium Salts and Their Reactivity for C02/Epoxide Copolymerization, Bull. Korean Chem. Soc., 2010, pp. 829-834, vol. 31, No. 4.

Min et al., Efficient Synthesis of a Highly Active Catalyst for C02/Epoxide Copolymerization, Bull. Korean Chem. Soc., 2009, pp. 745-748, vol. 30, No. 3.

Na et al., Elucidation of the Structure of a Highly Active Catalytic System for C02/Epoxide Copolymerization: A salen-Cobaltate Complex of an Unusual Binding Mode, Inorg. Chem., 2009, pp. 10455-10465, vol. 48.

Noh et al., Two Components in a Molecule: Highly Efficient and Thermally Robust Catalytic System for C02/Epoxide Copolymerization, J. Am. Chem. Soc., 2007, pp. 8082-8083, vol. 129.

Sujith et al., A Highly Active and Recyclable Catalytic System for C02/Propylene Oxide Copolymerization, Angew. Chem. Int. Ed., 2008, pp. 7306-7309, vol. 47.

Yoo et al., Anion variation on a cobalt(III) complex of salen-type ligand tethered by four quaternary ammonium salts for C02/epoxide copolymerization, Dalton Trans., 2010, pp. 2622-2630, vol. 39.

\* cited by examiner

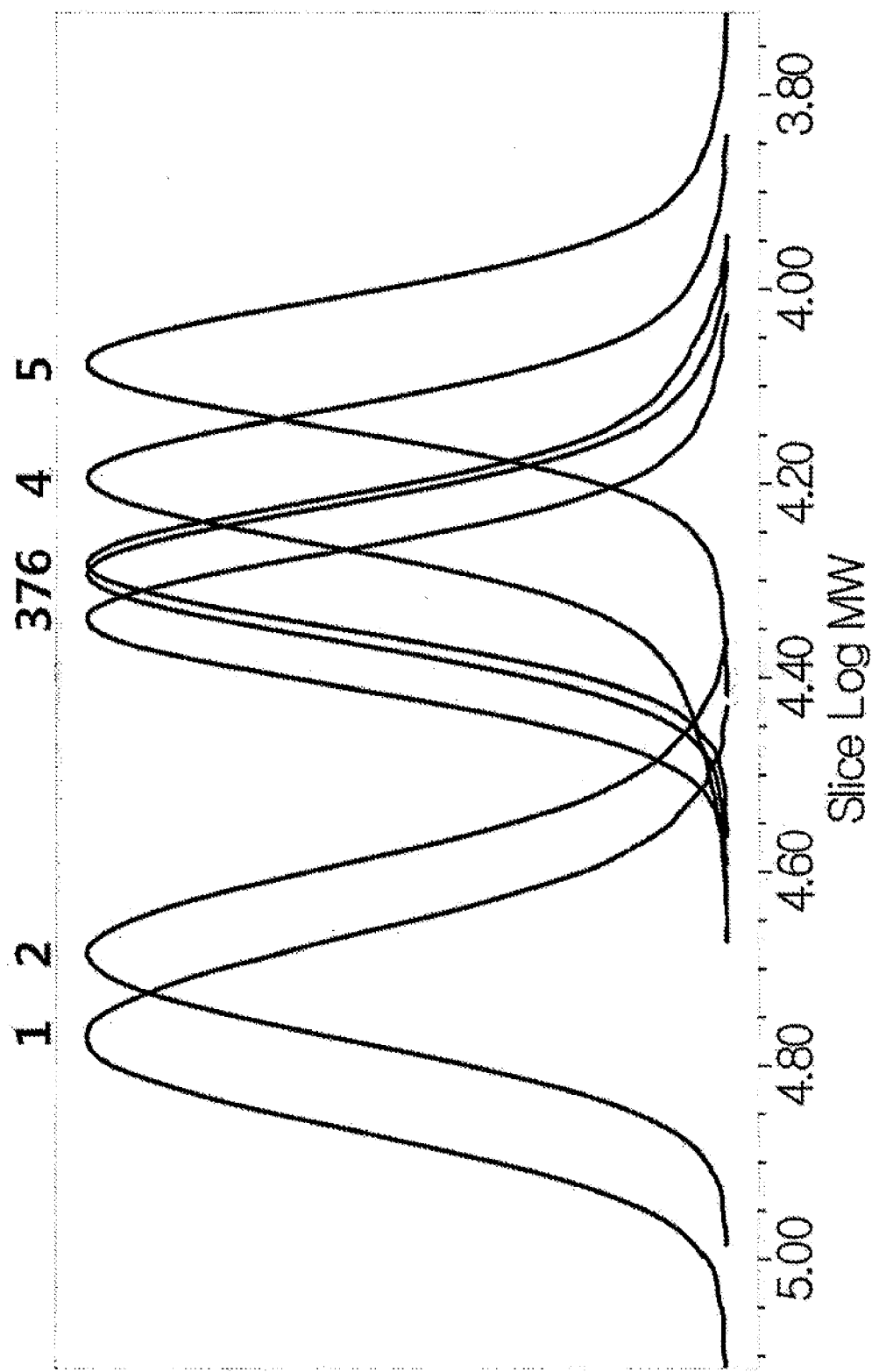

FLAME-RETARDING CARBON DIOXIDE/EPOXIDE COPOLYMER AND METHOD FOR PREPARING THE SAME

CROSS-REFERENCE TO RELATED APPLICATIONS

This application is a divisional of U.S. patent application Ser. No. 13/369,991, filed Feb. 9, 2012 now U.S. Pat. No. 8,912,307, which claims priority under 35 U.S.C. §119 to Korean Patent Application No. 10-2011-0011754, filed on Feb. 10, 2011, in the Korean Intellectual Property Office, the disclosures of which are incorporated herein by reference in their entireties.

TECHNICAL FIELD

The following disclosure relates to a carbon dioxide/epoxide copolymer containing a phosphate or phosphonate group in a polymer chain to exhibit flame-retarding property and a method for preparing the same.

BACKGROUND

Poly(alkylene carbonate) is an easily biodegradable polymer, and is useful as, for example, an adhesive agent, a packaging material, or a coating material. A method for preparing poly(alkylene carbonate) from an epoxide compound and carbon dioxide is highly eco-friendly in that phosgene, which is a poisonous compound, is not used and carbon dioxide is cheaply obtained.

Many researchers have developed various types of catalysts in order to prepare poly(alkylene carbonate) from an epoxide compound and carbon dioxide since 1960s. The present inventors recently disclosed a high-activity and high-selectivity catalyst synthesized from quaternary ammonium salt-containing Salen; ([H$_2$Salen=N,N'-bis(3,5-dialkylsalicylidene)-1,2-ethylenediamine]-type ligand [Bun Yeoul Lee, Korean Patent Registration No. 10-0853358 (2008 Aug. 13); Bun Yeoul Lee, Sujith S, Eun Kyung Noh, Jae Ki Min, Korean Patent Registration No. 10-2008-0015454 (2008 Feb. 20); Bun Yeoul Lee, Sujith S, Eun Kyung Noh, Jae Ki Min, PCT/KR2008/002453 (2008 Apr. 30); Eun Kyung Noh, Sung Jae Na, Sujith S, Sang-Wook Kim, and Bun Yeoul Lee, *J. Am. Chem. Soc.* 2007, 129, 8082-8083 (2007 Jul. 4); Sujith S, Jae Ki Min, Jong Eon Seong, Sung Jae Na, and Bun Yeoul Lee, *Angew. Chem. Int. Ed.*, 2008, 47, 7306-7309 (2008 Sep. 8)]. The catalyst disclosed by the present inventors exhibits high activity and high selectivity, and allows the preparation of a copolymer having a large molecular weight. Also, polymerization thereof is possible even at a high temperature, and thus, the catalyst can be applied in a commercial process. In addition, since a quaternary ammonium salt is contained in the ligand, the catalyst can be easily separated from the copolymer after a copolymerization reaction with carbon dioxide/epoxide and reused.

In addition, the present inventors carefully analyzed, particularly, the structure of a catalyst exhibiting high activity and high selectivity as compared with others among a catalyst group of the patent, and then found that the catalyst has a particular structure not known in the literature, in which a nitrogen atom of the Salen-ligand is not coordinated but only oxygen atoms are coordinated to a metal (see, Structure 1 below, Sung Jae Na, Sujith S, Anish Cyriac, Bo Eun Kim, Jina Yoo, Youn K. Kang, Su Jung Han, Chongmok Lee, and Bun Yeoul Lee, "Elucidation of the Structure of A Highly Active Catalytic System for CO$_2$/Epoxide Copolymerization: A Salen-Cobaltate Complex of An Unusual Binding Mode" *Inorg. Chem.* 2009, 48, 10455-10465).

[Structure 1]

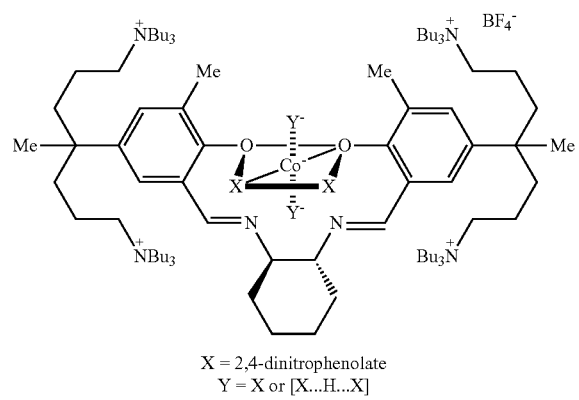

X = 2,4-dinitrophenolate
Y = X or [X...H...X]

In addition, there was developed a method of easily synthesizing the ligand of Structure 1 above (Min, J.; Seong, J. E.; Na, S. J.; Cyriac, A.; Lee, B. Y. *Bull. Korean Chem. Soc.* 2009, 30, 745-748).

The compound of Structure 1, which is a highly-active catalyst, is used to prepare poly(alkylene carbonate) having a high molecular weight economically. However, since the glass transition temperature of poly(alkylene carbonate) is low (40° C. for poly(alkylene carbonate) prepared by propylene oxide and carbon dioxide) and the mechanical strength thereof is not high, there are certain limitations in developing usage of poly(alkylene carbonate).

As a way for overcoming these limitations of poly(alkylene carbonate), the present inventors developed and reported methods for preparing poly(alkylene carbonate) diol or polyol having a low molecular weight and also a plurality of —OH terminal groups and using the same for preparing polyurethane (Anish Cyriac, Sang Hwan Lee, Jobi Kodiyan Varghese, Eun Seok Park, Ji Hae Park, and Bun Yeoul Lee, *Macromolecules* 2010, 43, 7398-7401). Scheme 1 below shows a preparation mechanism of poly(alkylene carbonate) diol or polyol having a low molecular weight and a plurality of —OH terminal groups by the catalyst of Structure 1 above. Here, X⁻ contained in the catalyst of Structure 1 above nucleophilically attacks epoxide coordinated with a metal, which is acting as a Lewis acid, thereby starting copolymerization of carbon dioxide/epoxide. When the polymerization reaction is started, growth of polymer chain from X⁻ contained in the catalyst is started, and resultantly, X⁻ becomes a polymer chain of which a terminal group is a carbonate or alkoxy anion. Here, when a (J(LH)$_c$) compound containing an —OH group is introduced as a chain transfer agent in order to regulate the molecular weight, the carbonate or alkoxy anion takes protons contained in the (J(LH)$_c$) compound to become an alcohol or carbonic acid type compound, and the J(LH)$_c$ compound becomes a carboxyl or alkoxy anion. Once the J(LH)$_c$ compound becomes the carboxyl or alkoxy anion, a polymer chain may grow therefrom. A proton exchange reaction rapidly occurs. Hence, the polymer material resultantly obtained by this proton exchange reaction and a chain growth reaction includes a polymer chain grown from X⁻ contained in the initial catalyst and also a polymer chain grown from the J(LH)$_c$ compound introduced as a chain transfer agent. The molecular weight and chain shape of the polymer may be controlled depending on the amount and the structure of introduced chain transfer agent.

[Scheme 1]

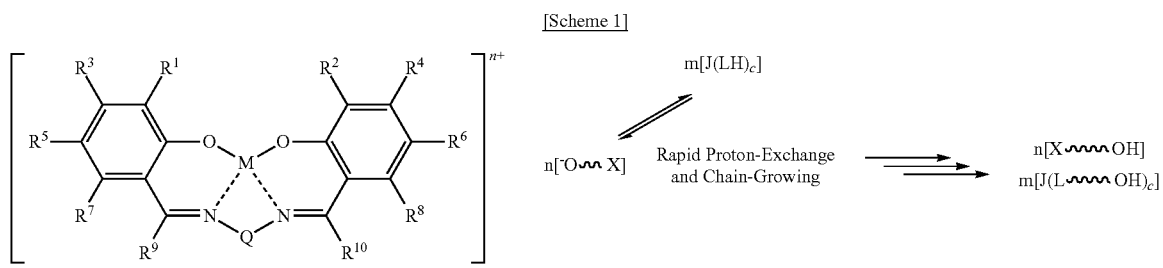

However, in the above Scheme 1, an organic alcohol compound or a carboxyl compound was used as the chain transfer agent. Further, it was not reported that a phosphorous compound is used as the chain transfer agent, to prepare poly(alkylene carbonate) having precisely controlled molecular weight and polymer chain structure. Further, it is not reported that a phosphorous compound is used as the chain transfer agent in a polymerization reaction of epoxide and carbon dioxide, to include a phosphate or phosphonate group in the polymer chain, thereby preparing a carbon dioxide/epoxide copolymer exhibiting flame-retarding property.

SUMMARY

An embodiment of the present invention is directed to providing a method for preparing a low-molecular weight poly(alkylene carbonate) of which the molecular weight and chain shape are precisely controlled, by introducing a phosphorous chain transfer agent to a complete alternating copolymerization reaction of carbon dioxide/epoxide using the previously developed highly active catalyst, and directed to providing a poly(alkylene carbonate) containing a phosphate or phosphonate group in a polymer chain, prepared from the method.

Poly(alkylene carbonate) including a phosphate or phosphonate group in the polymer chain, according to the present invention, has flame-retarding property, and thus the poly(alkylene carbonate) itself has usefulness, and when the poly(alkylene carbonate) is blended with other polymers or when the poly(alkylene carbonate) is used to prepare polyurethane, flame-retarding property can be imparted thereto.

In general, a method for preparing the poly(alkylene carbonate) includes, with the use of a complex of Chemical Formula 1 below as a catalyst and under the presence of a compound of Chemical Formula 5 below, alternating copolymerizing carbon dioxide and at least one epoxide compound selected from the group consisting of (C2-C20)alkyleneoxide substituted or unsubstituted with halogen, (C1-C20)alkoxy, (C6-C20)aryloxy, or (C6-C20)ar(C1-C20)alkyl(aralkyl)oxy; (C4-C20)cycloalkyleneoxide substituted or unsubstituted with halogen, (C1-C20)alkoxy, (C6-C20)aryloxy or (C6-C20)ar(C1-C20)alkyl(aralkyl)oxy; and (C8-C20)styreneoxide substituted or unsubstituted with halogen, (C1-C20)alkoxy, (C6-C20)aryloxy, (C6-C20)ar(C1-C20)alkyl(aralkyl)oxy, or (C1-C20)alkyl.

[Chemical Formula 1]

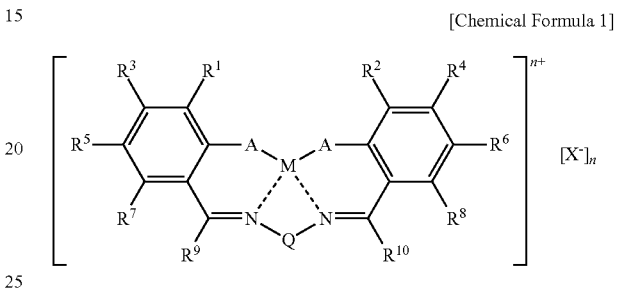

In Chemical Formula 1,

M represents trivalent cobalt or trivalent chromium;

A represents an oxygen or sulfur atom;

Q represents a diradical linking two nitrogen atoms;

$R^1$ through $R^{10}$ each independently represent hydrogen; halogen; (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; (C1-C20)alkoxy; (C6-C30)aryloxy; formyl; (C1-C20)alkylcarbonyl; (C6-C20)arylcarbonyl; or a metalloid radical of group 14 metal substituted with (C1-C20)alkyl or (C6-C20)aryl;

two of $R^1$ through $R^{10}$ may be linked to each other to form a ring;

at least one of hydrogens included in $R^1$ through $R^{10}$ and Q is substituted with a cationic group selected from the group consisting of Chemical Formula a, Chemical Formula b, and Chemical Formula c below;

[Chemical Formula a]

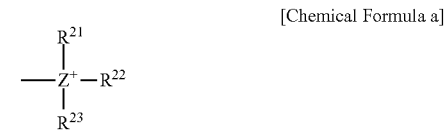

[Chemical Formula b]

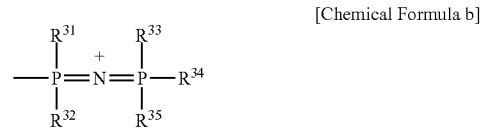

[Chemical Formula c]

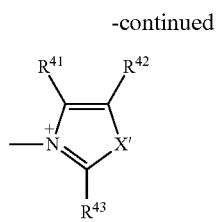

X⁻ each independently represents a halide ion; $HCO_3^-$; $BF_4^-$; $ClO_4^-$; $NO_3^-$; $PF_6^-$; (C6-C20)aryloxy anion; (C6-C20)aryloxy anion containing one or more atoms selected from halogen atom, nitrogen atom, oxygen atom, silicon atom, sulfur atom, and phosphorus atom; (C1-C20)alkylcarboxyl anion; (C1-C20)alkylcarboxyl anion containing one or more atoms selected from halogen atom, nitrogen atom, oxygen atom, silicon atom, sulfur atom, and phosphorus atom; (C6-C20)arylcarboxyl anion; (C6-C20)arylcarboxyl anion containing one or more atoms selected from halogen atom, nitrogen atom, oxygen atom, silicon atom, sulfur atom, and phosphorus atom; (C1-C20)alkoxy anion; (C1-C20)alkoxy anion containing one or more atoms selected from halogen atom, nitrogen atom, oxygen atom, silicon atom, sulfur atom, and phosphorus atom; (C1-C20)alkylcarbonate anion; (C1-C20)alkylcarbonate anion containing one or more atoms selected from halogen atom, nitrogen atom, oxygen atom, silicon atom, sulfur atom, and phosphorus atom; (C6-C20)arylcarbonate anion; (C6-C20)arylcarbonate anion containing one or more atoms selected from halogen atom, nitrogen atom, oxygen atom, silicon atom, sulfur atom, and phosphorus atom; (C1-C20)alkylsulfonate anion; (C1-C20)alkylsulfonate anion containing one or more atoms selected from halogen atom, nitrogen atom, oxygen atom, silicon atom, sulfur atom, and phosphorus atom; (C1-C20)alkylamido anion; (C1-C20)alkylamido anion containing one or more atoms selected from halogen atom, nitrogen atom, oxygen atom, silicon atom, sulfur atom, and phosphorus atom; (C6-C20)arylamido anion; (C6-C20)arylamido anion containing one or more atoms selected from halogen atom, nitrogen atom, oxygen atom, silicon atom, sulfur atom, and phosphorus atom; (C1-C20)alkylcarbamate anion; (C1-C20)alkylcarbamate anion containing one or more atoms selected from halogen atom, nitrogen atom, oxygen atom, silicon atom, sulfur atom, and phosphorus atom; or (C6-C20)arylcarbamate anion; (C6-C20)arylcarbamate anion containing one or more atoms selected from halogen atom, nitrogen atom, oxygen atom, silicon atom, sulfur atom, and phosphorus atom;

Z represents a nitrogen or phosphorous atom;

$R^{21}$, $R^{22}$, $R^{23}$, $R^{31}$, $R^{32}$, $R^{33}$, $R^{34}$ and $R^{35}$ each independently represents (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; or a metalloid radical of group 14 metal substituted with (C1-C20)alkyl or (C6-C20)aryl; and two of $R^{21}$, $R^{22}$ and $R^{23}$, or two of $R^{31}$, $R^{32}$, $R^{33}$, $R^{34}$ and $R^{35}$ may be liked to each other to form a ring;

$R^{41}$, $R^{42}$ and $R^{43}$ each independently represents hydrogen; (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; or a metalloid radical of group 14 metal substituted with (C1-C20)alkyl or (C6-C20)aryl; and two of $R^{41}$, $R^{42}$ and $R^{43}$ may be liked to each other to form a ring;

X' represents an oxygen atom, a sulfur atom, or N—R (here, R represents (C1-C20)alkyl);

n represents an integer obtained by adding 1 to the total number of cationic groups contained in $R^1$ to $R^{10}$ and Q;

X⁻ may be coordinated to M; and a nitrogen atom of imine may be coordinated to M or may be decoordinated from M.

[Chemical Formula 5]

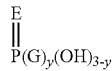

In Chemical Formula 5, E represents O or S;

G represents (C1-C60)alkyl, (C1-C60)alkoxy, (C6-C60)aryl, (C6-C60)aryloxy, (C1-C60)alkyl substituted with carboxyl, (C1-C60)alkoxy substituted with carboxyl, (C1-C60)alkyl substituted with hydroxyl, or (C1-C60)alkoxy substituted with hydroxyl;

y represents an integer of 0 to 3, when y represents an integer of 2 or more, respective G may be the same as or different from each other, and may be linked via neighboring G and —O-L-[L represents (C2-C60)alkylene, (C2-C60)alkenylene, or (C6-C60)arylene] to form a fused ring;

when y represents 3, at least one of three Gs represents (C1-C60)alkyl substituted with carboxyl, (C1-C60)alkoxy substituted with carboxyl, (C1-C60)alkyl substituted with hydroxyl, or (C1-C60)alkoxy substituted with hydroxyl.

The copolymerization of carbon dioxide/epoxide using the compound of Chemical Formula 1 as a catalyst was patent-registered by the present inventors, and published on the journals (Korean Patent Registration No. 10-0853358; *J. Am. Chem. Soc.* 2007, 129, 8082-8083; *Angew. Chem. Int. Ed.*, 2008, 47, 7306-7309). In addition, a carbon dioxide/epoxide copolymerization reaction using the catalyst in the presence of the chain transfer agent was disclosed by the present inventors, but an organic alcohol compound or a carboxyl compound was used as the chain transfer agent. The reaction of using the phosphorous compound of Chemical Formula 5 provided by the present invention as the molecular weight regulator has been not reported. As such, the present invention is characterized by including a phosphorous compound, thereby imparting flame-retarding property.

Preferably, as the catalyst, there may be used a complex of Chemical Formula 1 in which M represents trivalent cobalt; A represents an oxygen atom; Q represents trans-1,2-cyclohexylene, phenylene, or ethylene; $R^1$ and $R^2$ represent the same or different primary (C1-C20)alkyl; $R^3$ through $R^{10}$ each independently represents hydrogen or —[$YR^{51}_{3-a}${

$(CR^{52}R^{53})_bN^+R^{54}R^{55}R^{56}\}_a$]; Y represents C or Si; $R^{51}$, $R^{52}$, $R^{53}$, $R^{54}$, $R^{55}$ and $R^{56}$ each independently represents hydrogen; halogen; (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; (C1-C20)alkoxy; (C6-C30)aryloxy; formyl; (C1-C20)alkylcarbonyl; (C6-C20)arylcarbonyl; or a metalloid radical of group 14 metal substituted with (C1-C20)alkyl or (C6-C20)aryl, and two of $R^{54}$, $R^{55}$ and $R^{56}$ may be linked to each other to form a ring; a represents an integer of to 3, b represents an integer of 1 to 20; and n represents an integer of 4 or more, which is obtained by adding 1 to the total number of quaternary ammonium salts contained in $R^3$ through $R^{10}$, provided that, at least three of $R^3$ through $R^{10}$ represent $—[YR^{51}{}_{3-a}\{(CR^{52}R^{53})_bN^+R^{54}R^{55}R^{56}\}_a]$ when a represents 1, at least two of $R^3$ through $R^{10}$ represent $—[YR^{51}{}_{3-a}\{(CR^{52}R^{53})_bN^+R^{54}R^{55}R^{56}\}_a]$ when a represents 2, and at least one of $R^3$ through $R^{10}$ represents $—[YR^{51}{}_{3-a}\{(CR^{52}R^{53})_bN+R^{54}R^{55}R^{56}\}_a]$ when a represents 3.

It was identified that, when each of $R^1$ and $R^2$ represents a primary alkyl and the number of quaternary ammonium salts contained in the compound is 3 or more in Chemical Formula 1, a peculiar coordination complex in which the nitrogen of an imine of Chemical Formula 1 is not coordinated is formed in the polymerization reaction, and thus particularly exhibits high activity in the copolymerization of carbon dioxide and epoxide. (*Inorg. Chem.* 2009, 48, 10455-10465; *Bulletin of Korean Chemical Society* 2010, 31(4), 829-834; *Dalton Transaction*, 2010, 39(10), 2622-2630; Korean Patent Application No. 10-2008-0074435 (2008 Jul. 30)). However, the copolymerization of carbon dioxide and epoxide performed by using this type of catalyst and introducing the compound of Chemical Formula 5 as a chain transfer agent was not disclosed.

More preferably, a compound of Chemical Formula 6 may be used as the catalyst:

The complex of Chemical Formula 6 above is a most desirable compound that can be applied in commercialization as a catalyst that can be easily synthesized in large quantities, and it was disclosed by the present inventors (*Macromolecules* 2010, 43, 7398-7401; *Bull. Korean Chem. Soc.* 2009, 30, 745-748). However, the copolymerization of carbon dioxide and epoxide performed by using this catalyst and introducing the compound of Chemical Formula 5 as a chain transfer agent was not disclosed.

Alternatively, as the chain transfer agent, there may be used a compound of Chemical Formula 5 in which E represents O; and y represents 0.

Alternatively, as the chain transfer agent, there may be used a compound of Chemical Formula 5 in which E represents O; y represents 1; and G represents (C1-C60)alkyl, (C1-C60)alkoxy, (C6-C60)aryl, (C6-C60)aryloxy, (C1-C60)alkyl substituted with carboxyl, (C1-C60)alkoxy substituted with carboxyl, (C1-C60)alkyl substituted with hydroxyl, or (C1-C60) alkoxy substituted with hydroxyl.

Alternatively, as the chain transfer agent, there may be used a compound of Chemical Formula 5 in which E represents O; y represents 1; and G represents phenyl.

Alternatively, as the chain transfer agent, there may be used a compound of Chemical Formula 5 in which E represents O; y represents 2; and G represents (C1-C60)alkyl, (C1-C60)alkoxy, (C6-C60)aryl, (C6-C60)aryloxy, (C1-C60)alkyl substituted with carboxyl, (C1-C60)alkoxy substituted with carboxyl, (C1-C60)alkyl substituted with hydroxyl, or (C1-C60) alkoxy substituted with hydroxyl, and may be linked to a neighboring G via

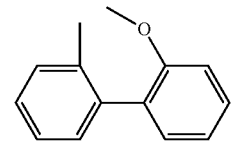

to form a fused ring.

Alternatively, as the chain transfer agent, there may be used a compound of Chemical Formula 5 in which E represents O; y represents 2; and G represents phenyl.

Specific examples of the compound of Chemical Formula 5 used as the chain transfer agent in the present invention may include compounds represented by Chemical Formula 5a to

[Chemical Formula 6]

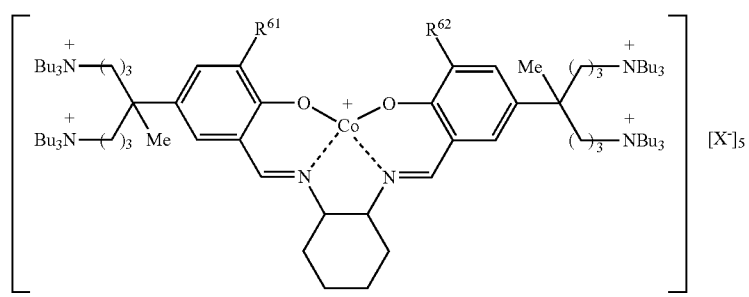

In Chemical Formula 6, $R^{61}$ and $R^{62}$ each independently represents methyl or ethyl; $X^-$ each independently represents nitrate or acetate anion; nitrogen of imine may coordinate to cobalt or may be decoordinated from cobalt, and respective anions may be coordinated to cobalt.

Chemical Formula 5i below, but is not limited thereto. The compounds of Chemical Formula 5a to Chemical Formula 5d below are reagents available in the market, and the compounds of Chemical Formula 5e to Chemical Formula 5i are developed as flame-retarding agents for a polyester or poly-carbonate resin (Fire Retardancy of Polymeric Materials, 2nd edition, edited by Charles A. Wilkie and Alexander B. Morgan, p 107-123).

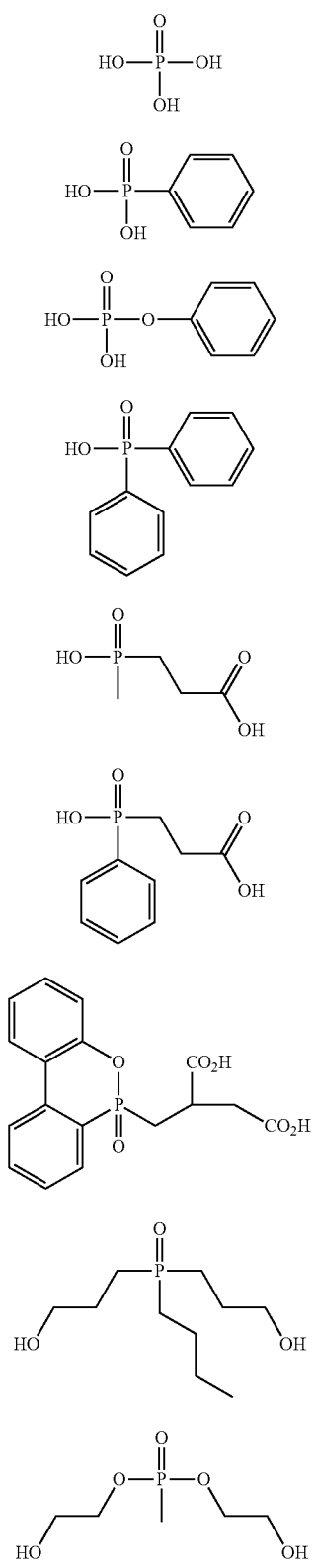

Chemical Formula 5a

Chemical Formula 5b

Chemical Formula 5c

Chemical Formula 5d

Chemical Formula 5e

Chemical Formula 5f

Chemical Formula 5g

Chemical Formula 5h

Chemical Formula 5i

In the preparing method of the present invention, specific examples of the epoxide compound may include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrin, epibromohydrin, isopropyl glycidyl ether, butyl glycidyl ether, t-butyl glycidyl ether, 2-ethylhexylglycidyl ether, allyl glycidyl ether, cyclopenetene oxide, cyclohexene oxide, cyclooctene oxide, cyclododecene oxide, alpha-pinene oxide, 2,3-epoxide norbornene, lemonene oxide, dieldrin, 2,3-epoxidepropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidyl naphthyl ether, and the like.

The epoxide compound may be used in polymerization by using an organic solvent as a reaction medium. As the organic solvent, there may be used one alone or a combination of two or more, of aliphatic hydrocarbons, such as, pentane, octane, decane, cyclohexane, and the like; aromatic hydrocarbons, such as, benzene, toluene, xylene, and the like; and halogenated hydrocarbons, such as, chloromethane, methylene chloride, chloroform, carbon tetrachloride, 1,1-dichloroethane, 1,2-dichloroethane, ethylchloride, trichloroethane, 1-chloropropane, 2-chloropropane, 1-chlorobutane, 2-chlorobutane, 1-chloro-2-methylpropane, chlorobenzene, bromobenzene, and the like. Preferably, bulk polymerization using a monomer itself as the solvent may be conducted.

A molar ratio of the epoxide compound to the catalyst, that is, a molar ratio of the epoxide compound: the catalyst may be 1,000 to 1,000,000, and preferably, 50,000 to 200,000. In the copolymerization reaction, the carbon dioxide pressure may range from normal pressure to 100 atm, and preferably, from 5 atm to 30 atm. In the copolymerization reaction, the polymerization temperature may range from 20° C. to 120° C., and preferably 50° C. to 90° C.

A batch type polymerization method, a semi-batch type polymerization method, or a continuous type polymerization method may be employed as the polymerization method for poly(alkylene carbonate). In a case of employing the batch type or semi-batch type polymerization method, the reaction time may be from 0.5 to 24 hours, and preferably 0.5 to 4 hours. In a case of employing the continuous type polymerization method, the retention time of catalyst may also be 0.5 to 4 hours, preferably.

In another general aspect, a method for preparing poly (alkylene carbonate), includes: preparing poly(alkylene carbonate); and contacting a solution containing the prepared copolymer and the catalyst dissolved therein with a solid phase inorganic material, a solid phase polymer material, or a mixture thereof, to form a complex of the solid phase inorganic material or the polymer material and the catalyst, and thereby to separate the prepared copolymer and the catalyst.

A method of using the same catalyst to perform the copolymerization of carbon dioxide/epoxide and then separating the catalyst therefrom was previously disclosed by the present inventors (Korean Patent Application No. 10-2008-0015454; Angew. Chem. Int. Ed., 2008, 47, 7306-7309). However, a method of introducing the compound of Chemical Formula 5 as a chain transfer agent to perform the copolymerization, and then separating the catalyst therefrom was not disclosed.

The solid phase inorganic material may be surface-modified or non-surface-modified silica or alumina, and the solid phase polymer material may be a polymer material having a functional group for allowing a deprotonation reaction by an alkoxy anion. In addition, the functional group for allowing a deprotonation reaction by an alkoxy anion may be a sulfonic acid group, a carboxylic acid group, a phenol group, or an alcohol group.

Specific examples of the solid phase inorganic material composed mainly of silicon or aluminum having a Bronsted acid site, which may provide a proton to an alkoxy anion or a carbonate anion, may include silica, alumina, aluminosilicate (zeolite), aluminophosphate, titanium silicate, clay, and the like. Preferably, the solid phase inorganic material is a surface-modified or non-surface-modified silica or alumina.

The polymer material is preferably cross-linked to have a number average molecular weight of 500 to 10,000,000. However, any polymer material that is not dissolved in a solution including a copolymer and a catalyst may be used even though the polymer material is not cross-linked. More specific examples of the "polymer material having a functional group for allowing a deprotonation reaction by an alkoxy anion" may include a copolymer including monomers of, such as, Chemical Formula A to Chemical Formula E, in the polymer chain, or a homopolymer constituted of only one of these monomers. The polymer material acting as this support may not be cross-linked as long as the polymer material is not dissolved in the above-described solution, but preferably, the polymer material is appropriately cross-linked in order to decrease the solubility thereof.

[Chemical Formula A]

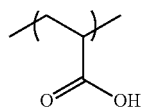

[Chemical Formula B]

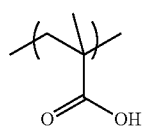

[Chemical Formula C]

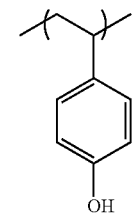

[Chemical Formula D]

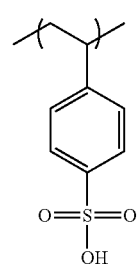

[Chemical Formula E]

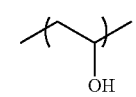

In still another general aspect, there is provided poly(alkylene carbonate) represented by Chemical Formula 7 below.

[Chemical Formula 7]

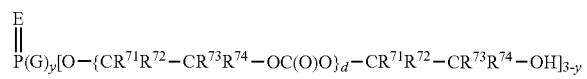

In Chemical Formula 7,

E represents O or S; G represents (C1-C60)alkyl, (C1-C60)alkoxy, (C6-C60)aryl or (C6-C60)aryloxy; represents an integer of 0 to 2; respective G may be the same as or different from each other when y represents 2;

$R^{71}$ through $R^{74}$ each independently represents hydrogen; (C1-C10)alkyl substituted or unsubstituted with halogen or (C1-C20)alkoxy; (C6-C12)aryl substituted or unsubstituted with a halogen atom or (C1-C20)alkoxy, and $R^{71}$ through $R^{74}$ may be linked to form a ring;

a value of multiplying d by (3-y) is an integer of 1 to 2000.

The maximum turnover number (TON) that can be achieved by the catalyst used in the present invention is approximately 30000. The polymer chain uniformly grows from $X^-$ contained in the catalyst and —OH group contained in the compound of Chemical Formula 5

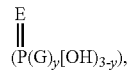

which is introduced as a chain transfer agent. The catalyst having a structure of Chemical Formula 6 has five $X^-$, and therefore, when following the preparing method of the present invention using this, there is obtained a mixture of a polymer chain grown from the five $X^-$ and a polymer chain grown from the —OH group of Chemical Formula 5 (see, Scheme 1 above). If the number of —OH functional groups, which are contained in the compound of Chemical Formula 5 introduced as a chain transfer agent, as compared with the number of catalyst molecules is 15 or more, the amount of the polymer chain grown from the introduced chain transfer agent occupies 75% or more of the amount of the total polymers. For this reason, the value of d is limited to 1500 or less in Chemical Formula 7. Since the minimum value of TON and the maximum amount of the introduced chain transfer agent are not limited, the minimum value of d is not limited. The d value is measurable by NMR spectrum analysis in a case of a sufficiently small molecular weight, and is measurable by using GPC through universal calibration in the case of a large molecular weight.

The molecular weight distribution of the polymer obtained through the present invention is significantly narrow (Mw/Mn<1.2) when the polymerization reaction is conducted by using a batch type rector. However, the molecular weight distribution may be widened according to the distribution of catalyst retention time when a continuous type reactor is used, and thus, there is not limited to the value obtained by the batch type reactor.

A low molecular weight poly(alkylene carbonate) polymer prepared through the present invention itself may be used for a coating material, an adhesive agent, which has flame-retarding property imparted, or may be blended with other polymers to impart flame-retarding property thereto. Also, the —OH group at the terminal group, which is contained in this polymer, may be used to prepare polyurethane having flame-retarding property imparted thereto.

More specifically, there is provided poly(alkylene carbonate) of Chemical Formula 7 in which E represents O; y represents 0; $R^{71}$ through $R^{74}$ each independently represents hydrogen or methyl, and which is obtained by copolymerization of carbon dioxide/ethylene oxide or carbon dioxide/propylene oxide using phosphoric acid as the chain transfer agent. The polymer chain obtained in this case has a star shape having three branches and has —OH group at the terminal group thereof, and thus may be used in preparing polyurethane and cause a cross-linking reaction.

Alternatively, and specifically, there is provided poly(alkylene carbonate) of Chemical Formula 7 in which E represents O; y represents 1; G represents (C1-C60)alkyl, (C1-C60) alkoxy, (C6-C60)aryl, or (C6-C60)aryloxy; $R^{71}$ through $R^{74}$ each independently represents hydrogen or methyl; and d represents an integer of 1 to 1500, and which is obtained by copolymerizing carbon dioxide/ethylene oxide or carbon dioxide/propylene oxide using phosphonic acid having two hydroxyl groups as the chain transfer agent. The polymer chain obtained in this case has a linear shape and has —OH group at the terminal group thereof, and thus may be used in preparing polyurethane.

In one embodiment of the present invention, phenylphosphonic acid, which can be available in the market at low costs and in large quantities, was used as a chain transfer agent.

Alternatively, and specifically, there is provided poly(alkylene carbonate) of Chemical Formula 7 in which E represents O; y represents 2; G represents (C1-C60)alkyl, (C1-C60) alkoxy, (C6-C60)aryl, or (C6-C60)aryloxy; and $R^{71}$ through $R^{74}$ each independently represents hydrogen or methyl, and which is obtained by copolymerization of carbon dioxide/ethylene oxide or carbon dioxide/propylene oxide using phosphonic acid having one hydroxyl group as the chain transfer agent. The polymer chain obtained in this case has a linear shape and has the —OH group at only one terminal group. In this case, since it is possible to increase the content of phosphorus therein, this polymer chain is useful in imparting insulation property to other resins by being blended with the resins.

In one embodiment of the present invention, diphenylphosphinic acid, which can be available in the market at low costs and in large quantities, was used as a chain transfer agent.

BRIEF DESCRIPTION OF THE DRAWINGS

FIG. 1 shows GPC curves of polymers prepared by introducing phosphoric acid as a chain transfer agent. It shows that the molecular weight is precisely controlled according to the amount of introduced phosphoric acid

DETAILED DESCRIPTION OF EMBODIMENTS

Effects of the present invention will be described in detail with reference to the following examples and comparative examples. However, the following examples are only for illustrating the present invention, but do not intend to limit the scope of the present invention.

Preparative Example 1

Synthesis of Catalyst

The catalyst used in the present invention was prepared as shown below. Compound A which is a starting material, was synthesized according to a known method (Bull. Korean Chem. Soc. 2009, 30, 745-748).

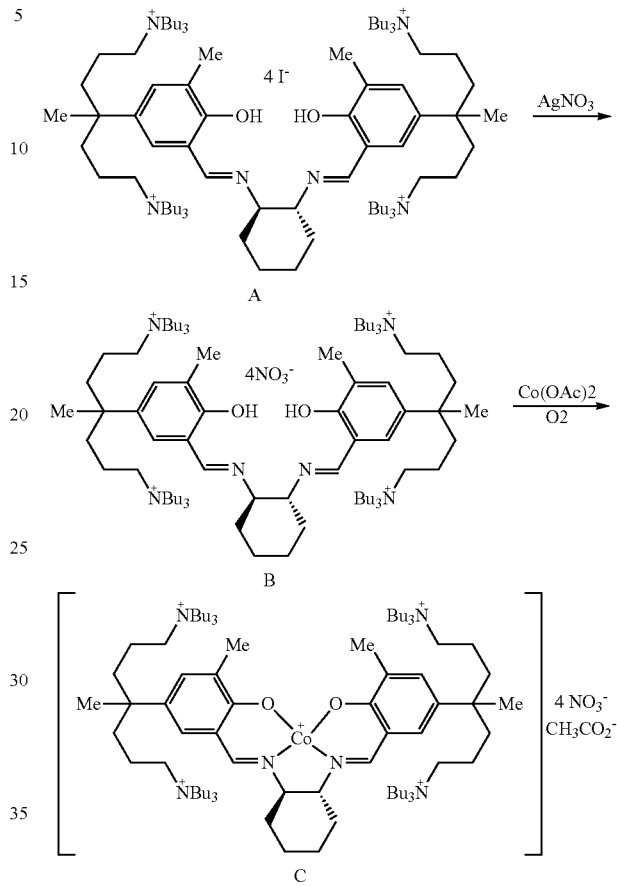

Synthesis of Compound B

Compound A (100 mg, 0.054 mmol) and $AgNO_3$ (37.3 mg, 0.219 mmol) were dissolved in ethanol (3 mL), followed by stirring overnight. The resulting mixture was filtered over celite, to remove generated AgI. The solvents were removed under reduced pressure, thereby obtaining yellow solid powder as Compound B (0.80 g, 94%).

$^1$H NMR ($CDCl_3$): δ13.51 (s, 2H, OH), 8.48 (s, 2H, CH=N), 7.15 (s, 4H, m-H), 3.44 (br, 2H, cyclohexyl-CH), 3.19 (br, 32H, $NCH_2$), 2.24 (s, 6H, $CH_3$), 1.57-1.52 (br, 4H, cyclohexyl-$CH_2$), 1.43-1.26 (br, 74H), 0.90-0.70 (br, 36H, $CH_3$) ppm.

Synthesis of Compound C

Compound B (95 mg, 0.061 mmol) and $Co(OAc)_2$ (10.7 mg, 0.061 mmol) were dissolved in methylene chloride (3 mL). The resulting material was stirred at room temperature for 3 hours under oxygen, and then the solvent was removed under reduced pressure, thereby obtaining brown solid powder as Compound C (85 mg, 83%).

$^1$H NMR (DMSO-$d_6$, 38° C.): Major signal set, δ 7.83 (s, 2H, CH=N) 7.27 (br s, 2H, m-H), 7.22, 7.19 (brs, 2H, m-H), 3.88 (br, 1H, cyclohexyl-CH), 3.55 (br, 1H, cyclohexyl-CH), 3.30-2.90 (br, 32H, $NCH_2$), 2.58 (s, 3H, $CH_3$), 2.55 (s, 3H, $CH_3$), 2.10-1.80 (br, 4H, cyclohexyl-$CH_2$), 1.70-1.15 (br m, 74H), 1.0-0.80 (br, 36H, $CH_3$) ppm; Minor signal set, δ 7.65 (s, 2H, CH=N) 7.45 (s, 2H, m-H), 7.35 (s, 2H, m-H), 3.60 (br, 2H, cyclohexyl-CH), 3.30-2.90 (br, 32H, $NCH_2$), 2.66 (s, 6H, $CH_3$), 2.10-1.80 (br, 4H, cyclohexyl-$CH_2$), 1.70-1.15 (br m, 74H), 1.0-0.80 (br, 36H, $CH_3$) ppm.

$^1$H NMR ($CD_2Cl_2$): δ 7.65 (br, 2H, CH=N) 7.34 (br, 2H, m-H), 7.16 (br, 2H, m-H), 3.40-2.00 (br, 32H, $NCH_2$), 2.93 (br s, 6H, $CH_3$), 2.10-1.80 (br m, 4H, cyclohexyl-$CH_2$), 1.70-1.15 (br m, 74H), 1.1-0.80 (br, 36H, $CH_3$) ppm.

Signals of two sets were observed at a ratio of 6:4 in $^1$H NMR spectrum in DMSO-$d_6$. The major signal set shows that two phenoxy of the Salen unit are different, and the minor signal set shows that two phenoxy are identical. The reason may be considered that Compound C is in an equilibrium state as will be described below in a DMSO solvent. It has been proved that the case where a substituent having small steric hindrance such as methyl is located at an ortho-position of two phenoxy of the Salen unit results in a structure in which the nitrogen of imine is not coordinated, in a polar solvent such as DMSO (*Inorg. Chem.* 2009, 48, 10455-10465). A single set of signals which is generally broad was observed in methylene chloride which is a nonpolar solvent. Considering weak coordination of the $NO_3^-$ anion, there is an expected structure in which the nitrogen of imine is coordinated and the nitrate anion and acetate anion are coordinated and decoordinated in an interchangeable manner on two axial coordination planes, as shown in the following structure.

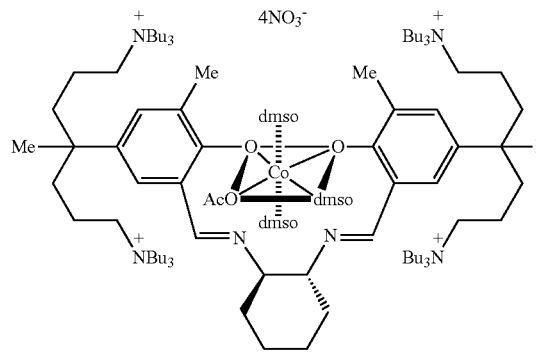
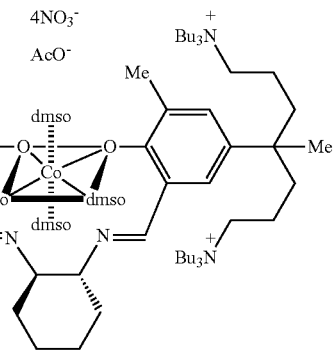

Expected Structure of Compound C in $CH_2Cl_2$

Example 1

Carbon Dioxide/Propylene Oxide Copolymerization Using Phosphoric Acid as Chain Transfer Agent and Catalyst Separation Copolymerization Reaction Compound C (3.0 mg, monomer/catalyst=100,000) prepared in Preparative Example 1 and propylene oxide (10.0 g, 172 mmol) were placed in a 50 mL bomb reactor, and phosphoric acid was added in an amount of 33, 67, 100, 133, or 167 times per mol of the catalyst, as summarized in Table 1 below, and then the reactor was assembled. A carbon dioxide pressure of 25 bars was applied to the reactor, and then the reactor was dipped in an oil bath of which the temperature is previously controlled to 73° C., followed by stirring. After 60 minutes, the internal temperature of the reactor reached 70° C., and from this time, the pressure of the reactor was observed to decrease. The polymerization reaction was carried out for 1 hour (Entry No. 1-No. 5), 1 hr and 30 min (Entry No. 6) or 2 hours (Entry No. 7) from the time at which the internal temperature of the reactor reached 70° C. and the

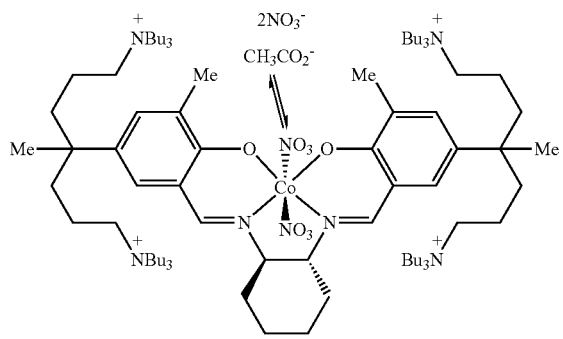

Expected Structure of Compound C in DMSO reaction was thus initiated. The reactor was dipped in a cooling bath and cooled, and then carbon dioxide gas was removed, thereby terminating the reaction. A light yellow viscous solution was obtained.

Catalyst Separation 10 g of propylene oxide was further added into the obtained viscous solution, thereby lowering viscosity of the solution. Then the resulting solution was passed through a silica gel (400 mg, manufactured by Merck, 0.040~0.063 mm particle size (230~400 mesh) pad, thereby obtaining a colorless solution. Monomers were removed using vacuum decompression. In some cases, about 1 to 10% of a propylene carbonate by-product was generated. The generated propylene carbonate by-product was removed by storing the sample in a vacuum oven at 150 t overnight. The copolymerization results are given in Table 1 below. FIG. 1 shows the change in molecular weight according to the amount of introduced phosphoric acid and the polymerization time, and the narrow molecular weight distribution of the obtained polymer. The numerals above respective curves designate Entry Nos. in Table 1.

TABLE 1

Results of Carbon Dioxide/Propylene Oxide Copolymerization
Using Phosphoric Acid as Chain Transfer Agent

| Entry No. | Phosphoric Acid (Equivalent/Co) | Measured Molecular Weight (Mn)[a] | Molecular Weight Distribution (Mw/Mn) | TON[b] | Glass Transition Temperature (Tg) (°C.) | Flammable Property |
|---|---|---|---|---|---|---|
| 1 | 33 | 56500 | 1.05 | 16300 | 40 | ○ |
| 2 | 67 | 46500 | 1.04 | 15300 | 39 | ○ |
| 3 | 100 | 21300 | 1.03 | 12600 | 33 | X |
| 4 | 133 | 15600 | 1.05 | 10200 | 29 | X |
| 5 | 167 | 11600 | 1.03 | 10800 | 30 | X |
| 6 | 167 | 19000 | 1.03 | 18600 | 29 | X |
| 7 | 167 | 19700 | 1.03 | 20000 | 31 | X |

[a] molecular weight measured by using a polystyrene standard through GPC.
[b] turnover number calculated by measuring mass of the polymer obtained after removing propylene carbonate by-product.

It can be seen from Table 1 above that the molecular weight of the polymer is precisely controlled depending on the amount of introduced phosphoric acid. In addition, as shown in Table 1 and FIG. 1, the molecular weight distribution (Mw/Mn) of the obtained polymer is about 1.05, which is considered to be considerably narrow. The polymer chain begins to grow from four nitrate anions and one acetate anion contained in Catalyst C. Once the nitrate anions and acetate anion begin to grow, they become alkoxy or carbonate anions, and these anions combine with protons of phosphoric acid introduced as a chain transfer agent, through an acid-base reaction. When the anions are neutralized by combining with protons, the growth of the polymer chain stops. On the other hand, growth of chain occurs from the carboxyl anion of phosphoric acid where the deprotonation reaction occurs. The acid-base reaction by migration of protons is significantly rapid, and the polymer chain entirely and uniformly grows from nitrate or acetate anions included in the early catalyst and also from the carboxyl group contained in phosphoric acid introduced as a chain transfer agent. Consequently, the polymer chain obtained by the polymerization reaction is a mixture of a polymer chain grown from nitrate or acetate anions and a polymer chain grown from phosphoric acid. The polymer chain grown from the phosphoric acid grows in both directions. The polymer chain grown from nitrate or acetate anions grows in one direction, and the length thereof is half the length of the polymer chain grown from phosphoric acid. Referring to FIG. 1, the number of polymer chains (33~167) grown from phosphoric acid in three directions is remarkably greater than the number of polymer chains (5) grown from nitrate or acetate anions, and thus, the amount of polymer chains grown from nitrate or acetate anion is ignorable. Hence, the GPC curve thereof is seen to be almost monomodal and the molecular weight distribution (Mw/Mn) thereof is very small about 1.05.

The terminal group of the chain grown using the present catalyst is in a type of carbonate or alkoxy anion, or carbonic acid or alcohol with a proton thereof. When the polymer after the polymerization reaction is passed through silica, all carbonate or alkoxy anions combine with protons and changed to carbonic acid or alcohol. In an atmosphere in which carbon dioxide has been removed, carbonic acid releases carbon dioxide to form alcohol. In other words, in the terminal group of the polymer chain obtained by removing the catalyst passing through silica after polymerization, the chain grown from the chain transfer agent becomes a diol type chain of which both terminal groups are alcohol, and the chain grown from nitrate or acetate anions contained in the catalyst becomes a mono-ol type chain of which one side ends to $NO_3^-$ or $CH_3CO_2^-$ and the other side ends to an alcohol group.

As the amount of introduced phosphoric acid increases, a polymer having a low molecular weight is obtained. Furthermore, in the case where the amount of phosphoric acid is much greater than the number of nitrate or acetate anions included in the catalyst, all of the polymers have a narrow molecular weight distribution. Therefore, it can be seen from this fact that the polymer chain grows from all of the introduced phosphoric acid.

In addition, it can be seen that flame-retarding property is imparted to the polymer depending on the amount of phosphoric acid used as the chain transfer agent. As seen from Table 1, in the case of using phosphoric acid in a content of 100 times (2400 ppm) or higher per mole of the catalyst, the polymer was not burn at the time of ignition. The reason is that, since the polymer chain grows from phosphoric acid, the phosphorus of phosphoric acid contained in the polymer chain acts as a flame-retarding agent, thereby providing a flame-retarding effect.

Example 2

Carbon Dioxide/Propylene Oxide Copolymerization Using Phenylphosphonic Acid as Chain Transfer Agent and Catalyst Separation The polymerization reaction was carried out in the same manner as in Example 1, except that phenylphosphonic acid (which is a compound of Formula 5b where E represents O, G represents phenyl, and y represents 1 in Chemical Formula 5) was used as a chain transfer agent, instead of phosphoric acid. The polymerization reaction was carried out for 1 hour (Entry Nos. 1~6, and 9), 1 hr and 30 min (Entry No. 7) or 2 hours (Entry No. 8) from the time at which the internal temperature of the reactor reached 70° C., and the catalyst was separated by the same method. The copolymerization results are given in Table 2 below.

TABLE 2

Results of Carbon Dioxide/Propylene Oxide Copolymerization Using
Phenylphosphonic Acid as Chain Transfer Agent

| Entry No. | Phenylphosphonic Acid (Equivalent/Co) | Measured Molecular Weight (Mn)[a] | Molecular Weight Distribution (Mw/Mn) | TON[b] | Glass Transition Temperature (Tg) (° C.) | Flammable Property |
|---|---|---|---|---|---|---|
| 1 | 100 | 27100 | 1.03 | 20000 | 39 | ○ |
| 2 | 150 | 18800 | 1.03 | 23000 | 32 | ○ |
| 3 | 200 | 11800 | 1.03 | 16000 | 30 | X |
| 4 | 300 | 8300 | 1.03 | 16100 | 29 | X |
| 5 | 400 | 6800 | 1.03 | 17100 | 24 | X |
| 6 | 500 | 3200 | 1.06 | 10200 | 23 | X |
| 7 | 500 | 5100 | 1.04 | 18100 | 21 | X |
| 8 | 500 | 6000 | 1.04 | 19700 | 31 | X |
| 9 | 600 | 3000 | 1.05 | 9000 | 23 | X |

[a] molecular weight measured by using a polystyrene standard through GPC.
[b] turnover number calculated by measuring mass of the polymer obtained after removing propylene carbonate by-product.

It can be seen from Table 2 above that the molecular weight of the polymer is precisely controlled depending on the amount of introduced phenylphosphonic acid. In addition, the molecular weight distribution (Mw/Mn) of the obtained polymer is about 1.05, which is considered to be considerably narrow.

In addition, it can be seen that flame-retarding property is imparted to the polymer depending on the amount of phenylphosphonic acid used as the chain transfer agent. As seen from Table 2, in the case of using phenylphosphonic acid in a content of 200 times (3800 ppm) per mole of the catalyst, the polymer was not burn at the time of ignition. The reason is that, since the polymer chain grows from phenylphosphonic acid, the phosphorus of phenylphosphonic acid contained in the polymer chain acts as a flame-retarding agent, thereby providing a flame-retarding effect.

Example 3

Carbon Dioxide/Propylene Oxide Copolymerization Using Diphenylphosphinic Acid as Chain Transfer Agent and Catalyst Separation The polymerization reaction was carried out in the same manner as in Example 1, except that diphenylphosphinic acid (which is a compound of Formula 5d where E represents O, G represents phenyl, and y represents 2 in Chemical Formula 5) was used as a chain transfer agent, instead of phosphoric acid. The polymerization reaction was carried out for 1 hour (Entry No. 1~No. 8, and No. 11), 1 hr and 30 min (Entry No. 9) or 2 hours (Entry No. 10) from the time at which the internal temperature of the reactor reached 70° C., and the catalyst was separated by the same method. The copolymerization results are given in Table 3 below.

TABLE 3

Results of Carbon Dioxide/Propylene Oxide Copolymerization Using
Diphenylphosphinic Acid as Chain Transfer Agent

| Entry No. | Diphenylphosphonic Acid (Equivalent/Co) | Measured Molecular Weight (Mn)[a] | Molecular Weight Distribution (Mw/Mn) | TON[b] | Glass Transition Temperature (Tg) (° C.) | Flammable Property |
|---|---|---|---|---|---|---|
| 1 | 200 | 17000 | 1.03 | 21600 | 32 | ○ |
| 2 | 300 | 10800 | 1.03 | 23000 | 30 | X |
| 3 | 400 | 8800 | 1.03 | 20800 | 36 | X |
| 4 | 600 | 5400 | 1.04 | 20500 | 27 | X |
| 5 | 800 | 3200 | 1.05 | 16500 | 29 | X |
| 6 | 1000 | 2400 | 1.05 | 16000 | 29 | X |
| 7 | 1200 | 1200 | 1.05 | 10000 | 19 | X |
| 8 | 1400 | 1100 | 1.05 | 11600 | 17 | X |
| 9 | 1400 | 1400 | 1.05 | 18300 | 26 | X |
| 10 | 1400 | 1700 | 1.06 | 19000 | 26 | X |
| 11 | 1600 | 900 | 1.05 | 8000 | 14 | X |

[a] molecular weight measured by using a polystyrene standard through GPC.
[b] turnover number calculated by measuring mass of the polymer obtained after removing propylene carbonate by-product.

It can be seen from Table 3 above that the molecular weight of the polymer is precisely controlled depending on the amount of introduced diphenylphosphinic acid. In addition, the molecular weight distribution (Mw/Mn) of the obtained polymer is about 1.05, which is considered to be considerably narrow.

In addition, it can be seen that flame-retarding property is imparted to the polymer depending on the amount of diphenylphosphinic acid used as the chain transfer agent. As seen from Table 3, in the case of using diphenylphosphinic acid in a content of 300 times (3800 ppm) per mole of the catalyst, the polymer was not burn at the time of ignition. The reason is that, since the polymer chain grows from diphenylphosphinic acid, the phosphorus of diphenylphosphinic acid contained in the polymer chain acts as a flame-retarding agent, thereby providing a flame-retarding effect.

As set forth above, the compound containing a phosphorus and including a hydroxyl group, as a chain transfer agent, is introduced to the carbon dioxide/epoxide copolymerization reaction, and thus, poly(alkylene carbonate) having precisely controlled molecular weight and polymer chain shape can be manufactured. Since the manufactured polymer has flame-retarding property by including a phosphate or phosophonate group in the polymer chain, the polymer itself can be used as a flame-retarding adhesive agent or coating agent, and also, since the polymer has a hydroxyl group at the terminal group thereof, the polymer can be useful in preparing polyurethane having flame-retarding property imparted thereto. Also, the polymer may be used to impart flame-retarding property to other polymers by being blended with other polymers.

What is claimed is:

1. Poly(alkylene carbonate) represented by Chemical Formula 7 below:

[Chemica Formula 7]

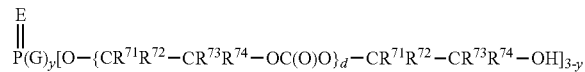

wherein, in Chemical Formula 7,

E represents O or S; G represents (C1-C60)alkyl, (C1-C60)alkoxy, (C6-C60)aryl or (C6-C60)aryloxy; y represents an integer of 0 to 2; respective G may be the same as or different from each other when y represents 2;

$R^{71}$ through $R^{74}$ each independently represent hydrogen; (C1-C10)alkyl substituted or unsubstituted with halogen or (C1-C20)alkoxy; (C6-C12)aryl substituted or unsubstituted with halogen or (C1-C20)alkoxy, and $R^{71}$ through $R^{74}$ may be linked to form a ring; and d represents an integer of 1 to 1500.

2. The poly(alkylene carbonate) of claim 1, wherein in the compound of Chemical Formula 7, E represents O; y represents 0; and $R^{71}$ through $R^{74}$ each independently represents hydrogen or methyl.

3. The poly(alkylene carbonate) of claim 1, wherein in the compound of Chemical Formula 7, E represents O; y represents 1; G represents (C1-C60)alkyl, (C1-C60)alkoxy, (C6-C60)aryl, or (C6-C60)aryloxy; and $R^{71}$ through $R^{74}$ each independently represents hydrogen or methyl.

4. The poly(alkylene carbonate) of claim 3, wherein G represents phenyl.

5. The poly(alkylene carbonate) of claim 1, wherein in the compound of Chemical Formula 7, E represents O; y represents 2; G represents (C1-C60)alkyl, (C1-C60)alkoxy, (C6-C60)aryl, or (C6-C60)aryloxy; and $R^{71}$ through $R^{74}$ each independently represents hydrogen or methyl.

6. The poly(alkylene carbonate) of claim 5, wherein G represents phenyl.

* * * * *